(12) United States Patent
Ho et al.

(10) Patent No.: US 12,667,806 B1
(45) Date of Patent: Jun. 30, 2026

(54) DIRECT AIR CAPTURE OF CARBON DIOXIDE WITH NANOFLUIDIC FLOWS

(71) Applicants: National Technology & Engineering Solutions of Sandia, LLC, Albuquerque, NM (US); Purdue Research Foundation, West Lafayette, IN (US)

(72) Inventors: Tuan A. Ho, Albuquerque, NM (US); Yifeng Wang, Sarasota, FL (US); Susan Rempe, Albuquerque, NM (US); Timothy S. Zwier, Livermore, CA (US); Guangping Xu, Albuquerque, NM (US); Cliff T. Johnston, West Lafayette, IN (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 344 days.

(21) Appl. No.: 18/381,696

(22) Filed: Oct. 19, 2023

(51) Int. Cl.
*B01D 53/22* (2006.01)
*B01D 53/26* (2006.01)
(Continued)

(52) U.S. Cl.
CPC ......... *B01D 53/229* (2013.01); *B01D 53/261* (2013.01); *B01D 53/265* (2013.01);
(Continued)

(58) Field of Classification Search
CPC B01D 53/229; B01D 69/1213; B01D 53/261; B01D 53/265; B01D 53/268;
(Continued)

(56) References Cited

U.S. PATENT DOCUMENTS 8,202,291 B1 * 6/2012 Brister ............ A61M 25/10185
623/23.65
9,682,344 B1 * 6/2017 Hall ...................... B01D 53/92
(Continued)

OTHER PUBLICATIONS

Custelcean, R. et al., "Direct Air Capture of CO2 with Aqueous Peptides and Crystalline Guanidines," Cell Reports Physical Science (2021) 2:100385, Apr. 21, 10 pages.
(Continued)

*Primary Examiner* — Anthony Shumate
(74) *Attorney, Agent, or Firm* — Daniel J. Jenkins

(57) ABSTRACT

A system for direct air capture of $CO_2$ (DACC) includes a membrane formed from compacted layered material and configured to draw $CO_2$ and $H_2O$ from air on a feed side of the membrane into interlayers in the membrane through gas over-solubility induced by nanopore confinement and a differential solubility of $CO_2$ over $N_2$ and $O_2$ in $H_2O$. The membrane includes a capture side for collecting a $CO_2$-enriched $H_2O$ flow configured to be generated on the capture side from the $CO_2$ and $H_2O$ drawn through the membrane. The relative humidity (RH) of the air loads and maintains therein at least one hydration layer of the interlayers of the compacted layered material.

10 Claims, 8 Drawing Sheets

(51) Int. Cl.
  *B01D 69/02* (2006.01)
  *B01D 69/12* (2006.01)
  *B01D 71/02* (2006.01)

(52) U.S. Cl.
  CPC ........... *B01D 53/268* (2013.01); *B01D 69/02* (2013.01); *B01D 69/1213* (2022.08); *B01D 71/02* (2013.01); *B01D 2257/504* (2013.01); *B01D 2257/80* (2013.01); *B01D 2258/06* (2013.01); *B01D 2325/02832* (2022.08); *B01D 2325/02833* (2022.08)

(58) Field of Classification Search
  CPC ..................... B01D 69/02; B01D 71/02; B01D 2325/02833; B01D 2325/02832; B01D 2257/504; B01D 2257/80; B01D 2258/06
  See application file for complete search history.

(56) References Cited

U.S. PATENT DOCUMENTS

| | | | | |
|---|---|---|---|---|
| 2010/0307959 | A1* | 12/2010 | Hong | C10G 1/047 208/391 |
| 2012/0191124 | A1* | 7/2012 | Brister | A61F 5/0043 606/192 |
| 2013/0058853 | A1* | 3/2013 | Baker | B01D 53/62 423/220 |
| 2013/0200625 | A1* | 8/2013 | Wei | F23C 9/00 290/52 |
| 2014/0026750 | A1* | 1/2014 | Jain | B01D 53/047 95/114 |
| 2014/0047818 | A1* | 2/2014 | Oelkfe | F02C 3/34 60/274 |
| 2014/0271420 | A1* | 9/2014 | Kirchman | B01D 53/18 422/187 |
| 2015/0276309 | A1* | 10/2015 | Beasse | C01B 32/50 62/617 |
| 2018/0134655 | A1* | 5/2018 | Custelcean | C07D 307/52 |
| 2019/0271266 | A1* | 9/2019 | Allam | F02C 3/34 |
| 2020/0346163 | A1* | 11/2020 | Benali | B01D 53/1456 |
| 2021/0238519 | A1* | 8/2021 | Wensel | C12M 23/44 |
| 2022/0161197 | A1* | 5/2022 | Kolodji | B01D 53/227 |
| 2025/0010236 | A1* | 1/2025 | Okano | C01B 32/50 |
| 2025/0108327 | A1* | 4/2025 | Shqau | B01D 69/147 |
| 2025/0197751 | A1* | 6/2025 | Maehara | C10G 2/50 |
| 2025/0262586 | A1* | 8/2025 | Liebman | B01D 53/0462 |

OTHER PUBLICATIONS

Sanz-Perez, E. S. et al., "Direct Capture of CO2 from Ambient Air," Chemical Review (2016) 116:11840-11876.

Ho, L. N. et al., "Solubility of Gases in Water Confined in Nanoporous Materials: ZSM-5, MCM-41, and MIL-100," Journal of Physical Chemistry C (2015) 119:21547-21554.

Dasgupta, N. et al., "Hydrophobic Nanoconfinement Enhances CO2 Conversion to H2CO3," The Journal of Physical Chemistry Letters (2023) 14:1693-1701.

Ho, T. A. et al., "Control of the Structural Charge Distribution and Hydration Sate Upon Intercalation of CO2 into Expansive Clay Interlayers," The Journal of Physical Chemistry Letters (2023) 14:2901-2909.

Ho, T. A. et al., "Control of Structural Hydrophobicity and Cation Solvation on Interlayer Water Transport during Clay Dehydration," Nano Letters (2022) 22:2740-2747.

Ho, T. A. et al., "Fast Advective Water Flow Through Nanochannels in Clay Interlayers: Implications for Moisture Transport in Soils and Unconventional Oil/Gas Production," ACS Applied Nano Materials (2020) 3:11897-11905.

Kumar, A. et al., "Direct Air Capture of CO2 by Physisorbent Materials," Angew. Chem. Int. Ed. (2015) 54:14372-14377.

Ramezan, M. et al., "Carbon Dioxide Capture from Existing Coal-Fired Power Plants," Department of Energy and National Energy Technology Laboratory, Final Report, DOE/NETL-401/110907, Dec. 2006, 229 pages.

Miachon, S. et al., "Higher Gas Solubility in Nanoliquids," ChemPhysChem (2008) 9:78-82.

Socolow, R. et al., "Direct Air Capture of CO2 with Chemicals, a Technology Assessment for the APS Panel on Public Affairs," APS Physics, Jun. 1, 2011, 100 pages.

Luzar, A. et al., "Gas Solubility in Hydrophobic Confinement," Journal of Physical Chemistry B (2005) 109:22545-22552.

Radha, B. et al., "Molecular Transport Through Capillaries Made with Atomic-Scale Precision," Nature (2016) 538: 222-237.

* cited by examiner

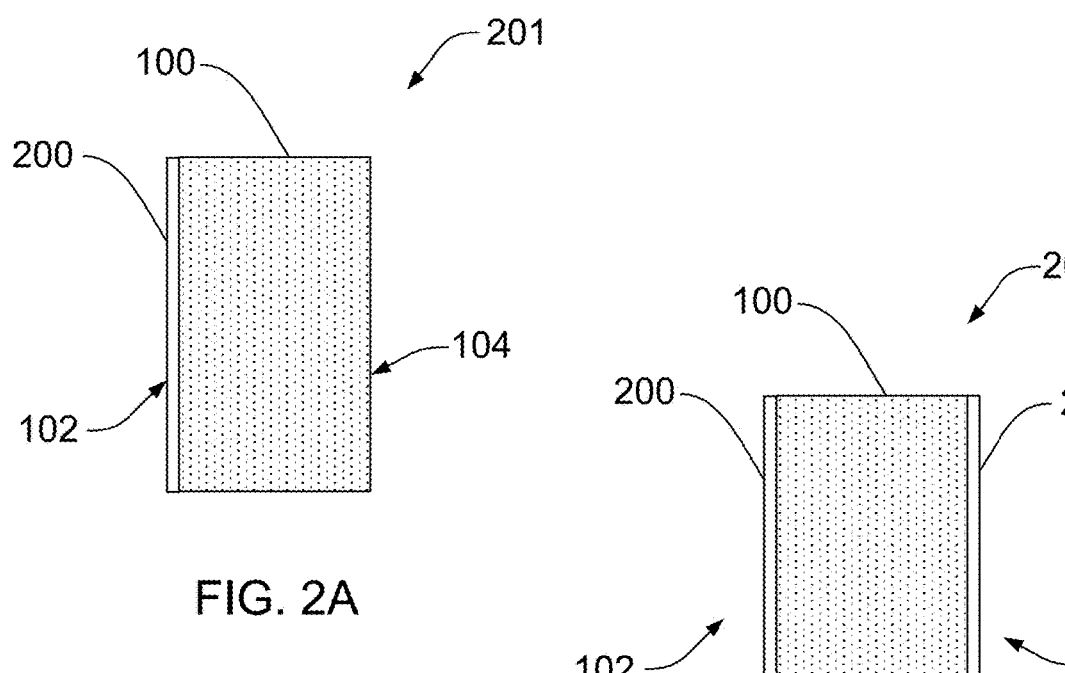
FIG. 2A
FIG. 2B
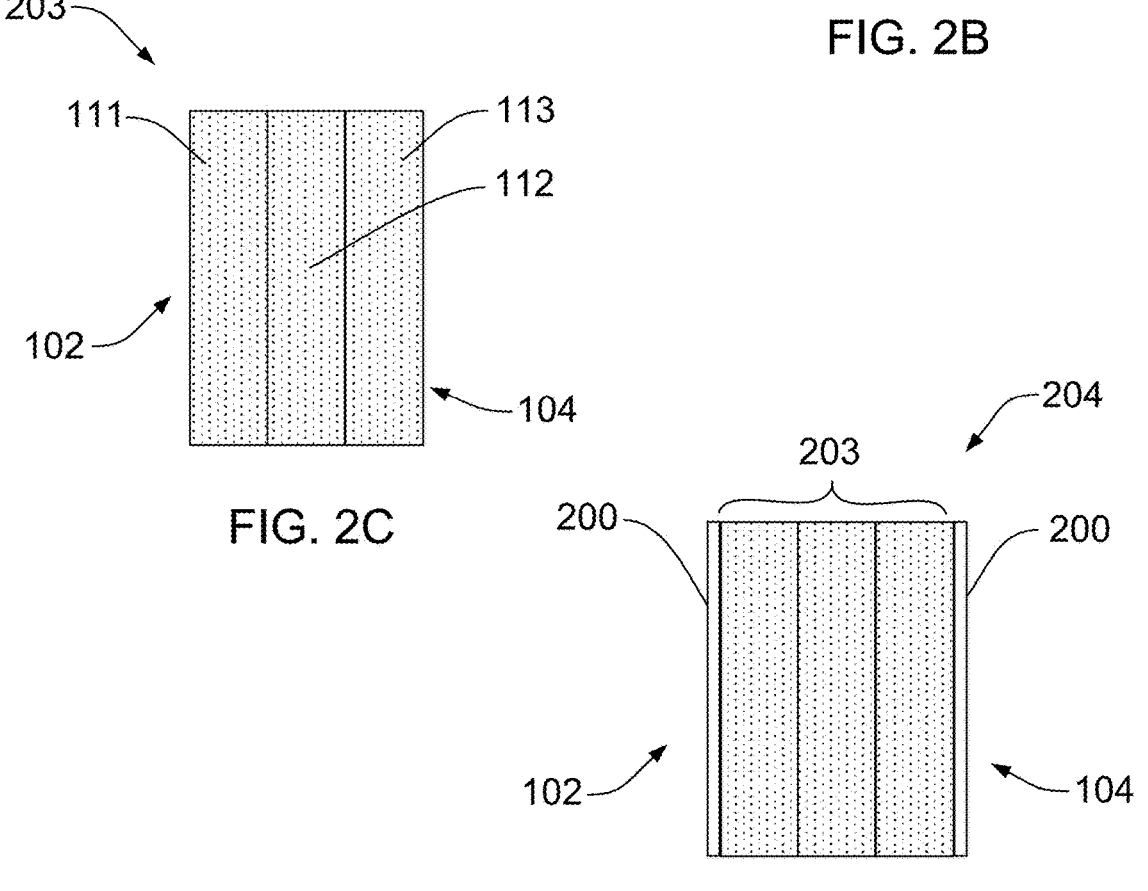
FIG. 2C
FIG. 2D

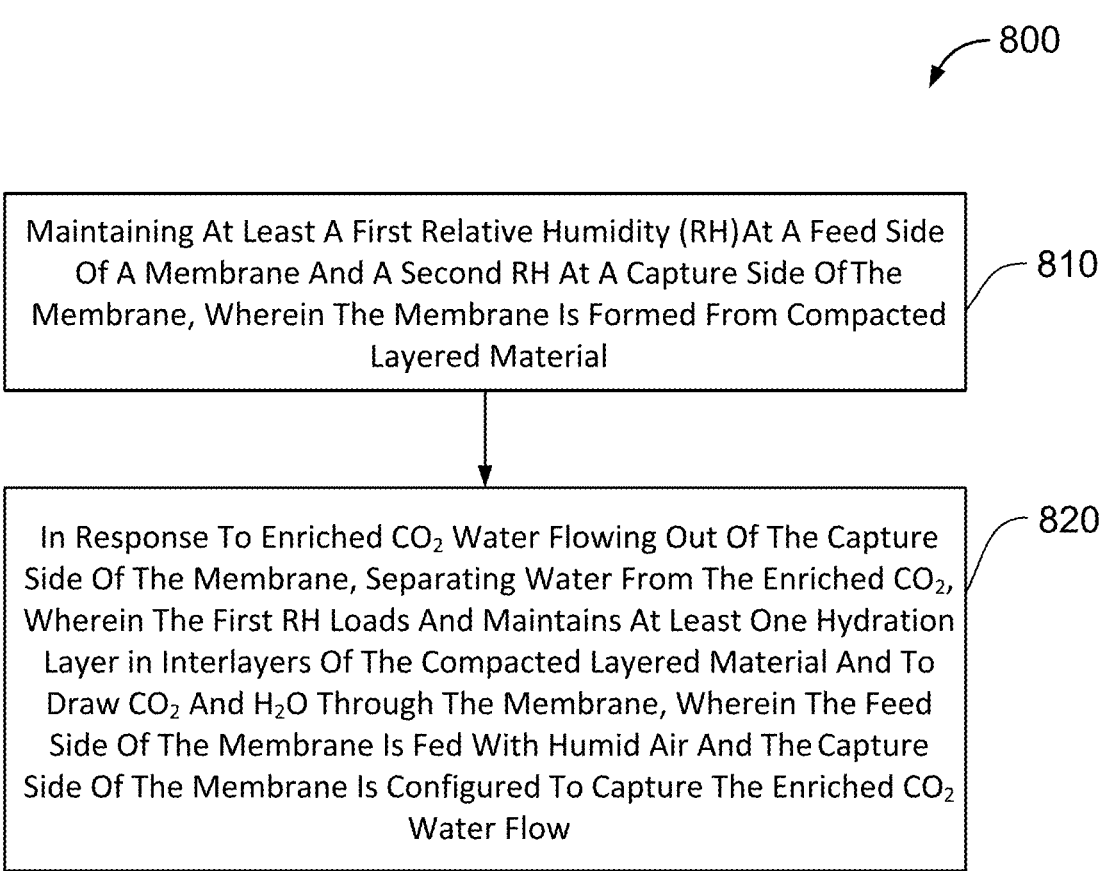

800

Maintaining At Least A First Relative Humidity (RH)At A Feed Side Of A Membrane And A Second RH At A Capture Side Of The Membrane, Wherein The Membrane Is Formed From Compacted Layered Material    810

In Response To Enriched $CO_2$ Water Flowing Out Of The Capture Side Of The Membrane, Separating Water From The Enriched $CO_2$, Wherein The First RH Loads And Maintains At Least One Hydration Layer in Interlayers Of The Compacted Layered Material And To Draw $CO_2$ And $H_2O$ Through The Membrane, Wherein The Feed Side Of The Membrane Is Fed With Humid Air And The Capture Side Of The Membrane Is Configured To Capture The Enriched $CO_2$ Water Flow    820

FIG. 8

DIRECT AIR CAPTURE OF CARBON DIOXIDE WITH NANOFLUIDIC FLOWS

STATEMENT REGARDING RESEARCH OR DEVELOPMENT

Described examples were made with Government support under Contract No. DE-NA0003525 awarded by the United States Department of Energy/National Nuclear Security Administration. The U.S. Government has certain rights in the invention.

TECHNICAL FIELD

The present disclosure relates to the field of carbon dioxide ($CO_2$) removal technology, and in particular relates to direct air capture of $CO_2$.

BACKGROUND

Burning fossil fuels such as coal, oil, and natural gas has elevated $CO_2$ concentration in the atmosphere, causing an extended greenhouse effect and fast-moving climate change. Stabilizing $CO_2$ emission while ensuring economic development is a challenge to a sustainable future. Despite efforts to promote the use of renewable energy, the existing technologies for reducing $CO_2$ emission are not considerably efficient. $CO_2$ may be captured from point-sources, e.g., coal-powered plants, to reduce anthropogenic $CO_2$ emission. While commercial carbon capture technologies (e.g., carbon capture technologies using amine-based or aqueous hydroxide sorbents) require energy infrastructures, a direct air capture of $CO_2$ (DACC) technology can be deployed in a more portable manner. Moreover, the standard capture processes require pre-processing of flue gas to remove $SO_x$ or $NO_x$. But such processes may cause degradation of sorbents and equipment used in the procedure. In contrast, DACC technology does not require pre-processing the flue gas to remove $SO_x$ or $NO_x$ and thus is less damaging to the reaction environment. However, the main issue with DACC is the high cost associated with capturing $CO_2$ from a relatively dilute source. As such, low-cost DACC technologies are in demand.

SUMMARY

Various embodiments include a system for direct air capture of $CO_2$ (DACC). The system includes a membrane formed from compacted layered material and configured to draw $CO_2$ and $H_2O$ from air on a feed side of the membrane into interlayers in the membrane through gas over-solubility induced by nanopore confinement and a differential solubility of $CO_2$ over $N_2$ and $O_2$ in $H_2O$. The membrane includes a capture side for collecting a $CO_2$-enriched $H_2O$ flow configured to be generated on the capture side from the $CO_2$ and $H_2O$ drawn through the membrane. The relative humidity (RH) of the air loads and maintains therein at least one hydration layer in the interlayers of compacted layered material.

In various embodiments, the membrane is further configured to maintain a predetermined RH for $H_2O$ vapor to condense into the interlayers such that $N_2$ and $O_2$ are restricted from passing through the membrane through the differential solubility of $CO_2$ over $N_2$ and $O_2$ in $H_2O$.

In various embodiments, the compacted layered material comprises at least one of: expandable clay and clay-derivative materials comprising montmorillonite, beidellite, nontronite, volkonskoite, hectorite, saponite, sauconite; graphene; or a graphene oxide. Th expandable clay and clay-derivative materials include at least one of cations $Na^+$, $K^+$, $Ca^{2+}$, $Li^+$, $Rb^+$, $Cs^+$, $Mg^{2+}$, or $Ba^{2+}$ in the interlayers.

In various embodiments, a porosity of the compacted layered material ranges from 5% to 40% and a pore size distribution of the compacted layered material may range from about 1 nm to about 100 nm.

In various embodiments, a dry density of the compacted layered material may range from 1.2 $g/cm^3$ to 1.5 $g/cm^3$. Dry density may be calculated as a dry weight of the compacted layered material divided by a bulk volume of the compacted layered material.

In various embodiments, a particle size of the compacted layered material may range from 10 nm to 10 μm.

In various embodiments, the membrane may include a structural support layer disposed on each of two opposed sides of the membrane.

In various embodiments, the system may further include at least one desiccator salt configured to absorb water from the $CO_2$-enriched $H_2O$ flow on the capture side.

In various embodiments, a ratio of a first RH at the feed side to a second RH at the capture side is at least 5:1.

In various embodiments, a first RH at the feed side is at least 50%, and a second RH at the capture side is less than 10%.

Various embodiments include a method for direct air capture of $CO_2$ (DACC), including maintaining at least a first relative humidity (RH) at a feed side of a membrane and a second RH at a capture side of the membrane, wherein the membrane is formed from compacted layered material, and in response to enriched $CO_2$ water flowing out of the capture side of the membrane, separating water from the enriched $CO_2$. The first RH may load and maintain at least one hydration layer in interlayers of the compacted layered material and to draw $CO_2$ and $H_2O$ through the membrane. The feed side of the membrane may be fed with humid air and the capture side of the membrane may be configured to capture the enriched $CO_2$ water flow.

In various embodiments, the method further includes compressing the captured $CO_2$-enriched water flow at low-pressure to encourage condensation of the $H_2O$.

In various embodiments, the first RH at the feed side is at least 50%, and the second RH at the capture side is equal to or less than 10%.

In various embodiments, the method further includes maintaining a predetermined RH on the feeding side for water vapor to condense into the interlayers such that $N_2$ and $O_2$ can be prevented from passing through the membrane through differential solubility of $CO_2$ over $N_2$ and $O_2$ in water.

In various embodiments, the method further includes placing at least one desiccator salt on the capture side of the membrane to absorb the water and separate the water from the enriched $CO_2$ water flow.

In various embodiments, the compacted materials may include at least one of: expandable clay and clay-derivative materials comprising montmorillonite, beidellite, nontronite, volkonskoite, hectorite, saponite, sauconite; graphene; or a graphene oxide. The expandable clay and clay-derivative materials may include at least one of cations $Na^+$, $K^+$, $Ca^{2+}$, $Li^+$, $Rb^+$, $Cs^+$, $Mg^{2+}$, or $Ba^{2+}$ in the interlayers.

In various embodiments, a porosity of the compacted layered material may range from 5% to 40% and a pore size distribution of the compacted layered material may range from about 1 nm to about 100 nm.

In various embodiments, a dry density of the compacted layered material may range from 1.2 g/cm³ to 1.5 g/cm³. The dry density may be calculated as a dry weight of the compacted layered material divided by a bulk volume of the compacted layered material.

In various embodiments, a particle size of the clay may range from 10 nm to 10 μm.

In various embodiments, an RH difference between the feed side and the capture side of the membrane may be adjustable for the water to flux across the membrane and the RH difference between the feed side and the capture side may supply an energy consumption of the $CO_2$ capture process.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to limit the scope, the embodiments will be described and explained with additional specificity and detail through the use of the drawings below.

FIG. 2A is a schematic diagram illustrating an alternative membrane assembly 201 that includes the membrane 100 as well as a structural support layer 200 on the feed side 102, according to various embodiments of the present disclosure.

FIG. 2B is a schematic diagram illustrating an alternative membrane assembly 202 that includes the membrane 100 as well as structural support layers 200 on each of the feed side 102 and the capture side 104, according to various embodiments of the present disclosure.

FIG. 2C is a schematic diagram illustrating an alternative membrane assembly 203 that includes multiple membranes 111, 112, 113 stacked in series, according to various embodiments of the present disclosure.

FIG. 2D is a schematic diagram illustrating an alternative membrane assembly 204 that includes the multi-membrane stack 203 as well as structural support layers 200 on each of the feed side 102 and the capture side 104, according to various embodiments of the present disclosure.

FIG. 8 is a flow chart showing the steps for a method of direct air capture of $CO_2$ (DACC) according to various embodiments of the present disclosure.

DETAILED DESCRIPTION OF THE EMBODIMENTS

The present disclosure provides a system for direct air capture of $CO_2$. The system may include a membrane of various forms. The membrane may include a compacted layer of expandable clay particles with interlayers there between. Humid air contacts with the feed side of the membrane to draw $CO_2$ and $H_2O$ into the interlayers to form hydration layers, while excluding nitrogen ($N_2$) and oxygen ($O_2$) gases. The membrane includes a feed side for feeding the humid air and a capture side for capturing $CO_2$-enriched $H_2O$ flow.

Current direct air capture of $CO_2$ (DACC) technology using physisorbent materials such as zeolite, activated carbon, or metal-organic framework (MOF) suffers from small $CO_2$ uptake and low $CO_2$ selectivity, especially in humid air. Alternative DACC technology uses chemisorbent materials such as potassium hydroxide (KOH), that have strong binding affinity for $CO_2$, has proven to be more effective. The heating process at high temperatures (e.g., 900° C.) are required to release $CO_2$ and regenerate sorbents via calcination, leading to a high cost. Modified amine-based DACC method using aqueous peptides and crystalline guanidines is estimated to be comparable or lower than current technologies; however, a similar problem also exists in addition to material cost.

The DACC concept according to the present disclosure arises through the combination of two central concepts: gas over-solubility in nanoconfinement and fast advective water flow in clay interlayers. In the DACC system according to the present disclosure, clays when contact with humid air will uptake $H_2O$ and swell to include one or two water layers. $CO_2$ is spontaneously concentrated in $H_2O$ which is confined in a clay interlayer. The $CO_2$ is then transported by an advective water flow driven by an imposed relative humidity (RH) gradient across the interlayer(s). The layered material may include various mineral species such as smectites including montmorillonite, beidellite, nontronite, volkonskoite, hectorite, saponite, and sauconite. The layered materials may be expandable clay and may include at least one of the following cations $Na^+$, $K^+$, $Ca^{2+}$, $Li^+$, $Rb^+$, $Cs^+$, $Mg^{2+}$, or $Ba^{2+}$ in the layered materials. The $CO_2$ and $H_2O$ collected at the capture side can be separated simply by deliquescence or compression. As used herein, the terms "water" and "$H_2O$" are used interchangeably.

In the DACC process according to the present disclosure, all the energy required is to drive the water flow and therefore this energy requirement is adjustable by changing the RH gradient across the system. According to the present disclosure, the system for direct air capture of $CO_2$ can operate at ambient temperatures without material regeneration.

Figures 1A, 1B:
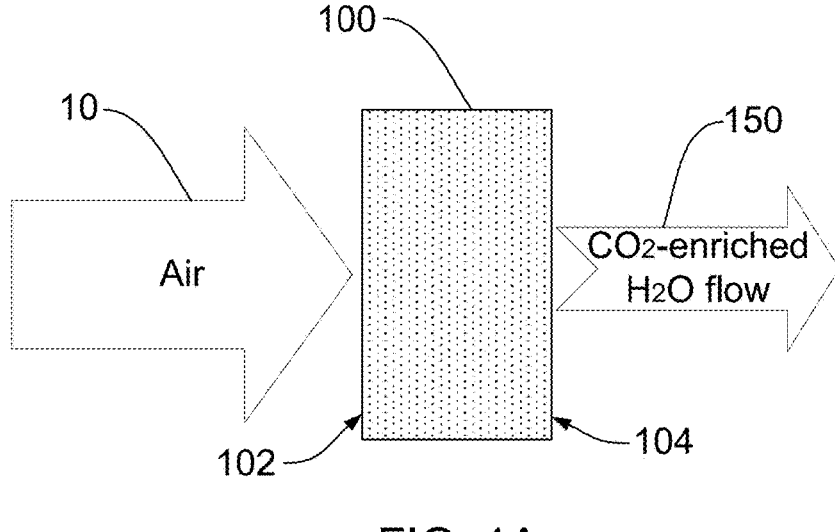
FIG. 1A is a schematic diagram illustrating a direct air capture system according to various embodiments of the present disclosure.
FIG. 1B is a schematic diagram illustrating a direct air capture system, including post membrane processing, according to various embodiments of the present disclosure.

FIG. 1A is a diagram illustrating a direct air capture system according to various embodiments of the present disclosure. As shown in FIG. 1A, air 10, having a relative humidity (RH), is introduced to a membrane 100 on a feed side 102. The membrane 100 may be a column or other layered arrangement formed from compacted layered materials that swell when in contact with air of high enough RH. The compacted layered materials may include expandable clay and clay-derivative materials. Clay and clay-derivative materials may have layered structures that together form a compacted layered material. The layers of the layered structure generally refer to a unit composed of one or two tetrahedral sheet(s) and one octahedral sheet. Some clays or clay-derivative materials may have a 1:1 layer structure, meaning they consist of one tetrahedral sheet bonded to one octahedral sheet; others may have a 2:1 layer structure, with two tetrahedral sheets sandwiching an octahedral sheet. Between these layers, there are interlayer spaces or galleries. Under certain circumstances, these interlayer spaces may be occupied by water molecules, cations, and other small molecules. Nanopores can be found in the interlayers of certain clay and clay-derivative materials. These nanopores are spaces between the layers where water, ions, and even organic molecules can be intercalated, and can be found in the space between particles. The existence of these nanopores gives rise to the high cation exchange capacity of many clay and clay-derivative materials. The size of these nanopores can vary depending on the specific type of clay and the cations or molecules present in the interlayer space. The compacted layered materials forming the membrane 100 may be formed such that the membrane 100 can hold its own shape while expanding and/or contracting based on exposure to different levels of RH in the air. Alternatively, the membrane 100 may include structural supports on one or more sides thereof, such as a polymer mesh and/or wire(s), fibrous screen, or other filter-like structure. Expansion of the compacted layered materials forming the membrane 100, from the RH in the air 10, may absorb $CO_2$ from the air, along with $H_2O$. The membrane 100 may draw $CO_2$ and $H_2O$ from air on one side of the membrane into nanopores of interlayers in the membrane 100 through gas over-solubility induced by nanopore confinement and a differential solubility of $CO_2$ over $N_2$ and $O_2$ in $H_2O$. In fact, a high enough RH in the air may form at least one hydration layer in the interlayers of the membrane 100. A hydration layer in the compacted layered material that forms the membrane 100 may be demonstrated, for example, by a d-spacing of clay. For example, the d-spacing of a clay material with one hydration layer may range from about 1.2 nm to about 1.25 nm. Water in the interlayers will generally reject (i.e., significantly restrict) nitrogen ($N_2$) in the air 10 from being drawn into the membrane 100. Water in general has a much lower solubility for $N_2$ than for $CO_2$, which is what prevents the passage of $N_2$. Furthermore, gas over-solubility in clay interlayers can be created due to the nanoconfinement. As a result, the ratio of $CO_2/H_2O$ in the interlayers may be one to two orders of magnitude higher than the ratio in bulk water.

In various embodiments, the RH of the humid air 10 on the feed side 102 of the membrane 100 may be maintained within a predetermined range that is high enough to load a pore volume of the membrane 100 in such a way that sustains at least one hydration layer in clay interlayers. For example, by maintaining the RH of the humid air 10 at approximately 50%, a hydration layer may form, in nanoscale clay interlayers that carries a desired $CO_2$ concentration in the water. In one instance, when the RH from the feed side 102 is set at 50%, the $CO_2$ concentration confined in the clay interlayers may achieve up to 145 g $CO_2$/liter $H_2O$. When the RH on the capture side 104 of the membrane 100 is reduced to 10%, e.g., using a vacuum, the generated RH gradient between the feed side 102 and the capture side 104 can rapidly generate a $CO_2$-enriched water flow 150 exiting the capture side 104 of the membrane 100. In another instance, the RH from the feed side 102 may be set for 40% while the RH on the capture side 104 of the membrane 100 may be reduced to 8%. In further instance, the RH from the feed side 102 may be set at 30% while the RH on the capture side 104 may be reduced to 6%. By maintaining a high-enough relative humidity on the feeding side, water vapor may condense into material nanopores such that $N_2$ and $O_2$ can be prevented from passing through the membrane through differential solubility of $CO_2$ over $N_2$ and $O_2$ in water. Air contains variable moisture. Thus, to maintain a predetermined RH on the feed side 102, additional moisture may be added to the air stream on that side. An RH sensor on the feed side 102 may measure RH and a processor monitoring the RH measurements may spray water on the feed side 102 as needed.

FIG. 1B is a diagram illustrating a direct air capture system with post membrane processing according to various embodiments of the present disclosure. As shown in FIG. 1B, the $CO_2$-enriched water flow 150 exiting the capture side 104 of the membrane 100 may optionally be drawn through a vacuum 160. The vacuum 160 may help maintain the RH on the capture side 104 low (e.g., <10% RH), which will in-turn draw more of the $H_2O$ and $CO_2$ out of the air 10 on the feed side 102.

Optionally, the humid air 10 may be driven to pass through a pretreatment zone such as bulky water, e.g., a layer of water disposed between the humid air 10 and membrane 100, such that the $H_2O$ from the bulky water can carry the $CO_2$ from the humid air 10. The bulky water may flow under the pressure of a pump or remain static. In some other embodiments, the water that functions as a vehicle for carrying $CO_2$ may be introduced to the humid air 10 by spraying water to the humid air 10. As such, a desired RH gradient can be achieved by a variety of ways of adding water to the humid air.

In various embodiments, $CO_2$ and $H_2O$ collected at the capture side 104 of the membrane 100, that is, in the form of $CO_2$-enriched water flow 150, can be separated further simply by subsequently passing the $CO_2$-enriched water flow 150 through a gas/water separator 170 through low-pressure compression to capture $CO_2$ 180 and condensed $H_2O$ 190.

In accordance with various embodiments, in the entire DACC process, heating is not required. The process can take place at ambient temperatures.

FIG. 2A illustrates an alternative membrane assembly 201 that includes the membrane 100 as well as a structural support layer 200 on the feed side 102, according to various embodiments of the present disclosure. Alternatively, the structural support layer 200 may be disposed on the capture side 104. The structural support layer 200 may be formed as a polymer mesh or wire(s), fibrous screen, or other filter-like structure.

FIG. 2B illustrates an alternative membrane assembly 202 that includes the membrane 100 as well as structural support layers 200, such as filters, on each of the feed side 102 and the capture side 104, according to various embodiments of the present disclosure.

FIG. 2C illustrates an alternative membrane assembly 203 that includes multiple membrane layers 111, 112, 113 stacked in series, according to various embodiments of the present disclosure. While the multiple membrane layers 111, 112, 113 may be pressed or held up against one another, such that no gap remains between them, alternatively a gap may be left between the multiple membrane layers 111, 112, 113. Optionally additional humid air fed into those gaps may increase the concentration of $H_2O$ and $CO_2$ pulled through the later membrane layers (e.g., 112, 113).

FIG. 2D illustrates an alternative membrane assembly 204 that includes the multi-membrane assembly 203 as well as structural support layers 200 on each of the feed side 102 and the capture side 104, according to various embodiments of the present disclosure.

Figure 2E:
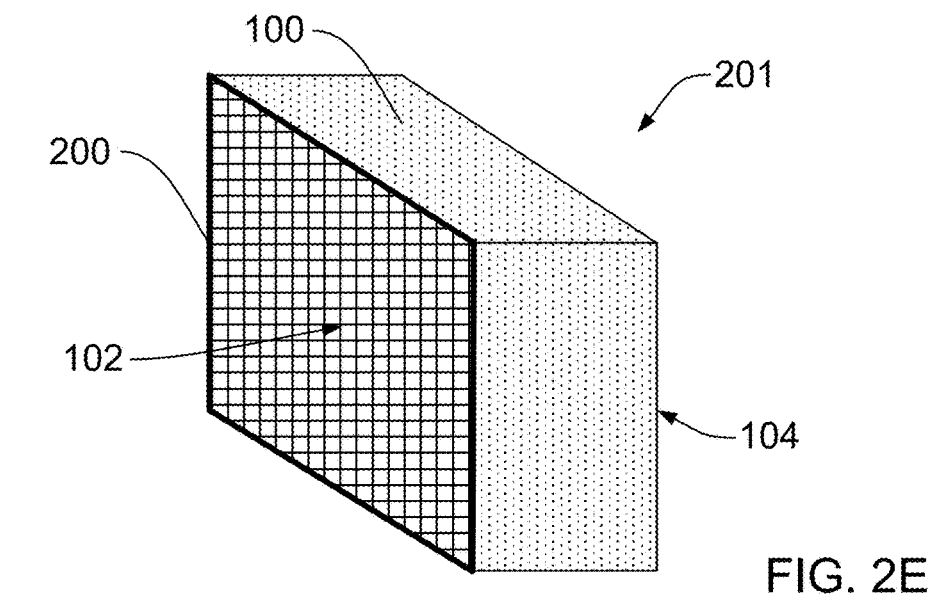
FIG. 2E is a schematic diagram illustrating an example of the structural support layer 200 used in conjunction with the membrane 100, according to various embodiments of the present disclosure.

FIG. 2E illustrates an example of the structural support layer 200 used in conjunction with the membrane 100, according to various embodiments of the present disclosure. The structural support layer 200 may be formed from wire, polymer fiber, or a combination of materials, forming support bands, a mesh, screen, or other support structure that allows the passage or absorption of gases or liquids. Also, as noted above, the structural support layer 200 may be formed as a filter and provide a filtering function. In fact, in some embodiments the structural support layer 200 formed as a filter need not actually provide structural support to the membrane 100.

In various embodiments, in the DACC process, the clay particles can swell when contacting humid air such as air above certain threshold level of relative humidity (RH). The swollen clay interlayers may then expand to adsorb $H_2O$. As such, at the meantime, $CO_2$ from the air from the feed side may also adsorb onto the clay interlayers along with $H_2O$.

When contacting humid air, swelling clay may expand to adsorb one or two water layers in the interlayers, $CO_2$ from air can also adsorb onto the clay interlayers. Moreover, $H_2O$ in clay interlayers may also reject $N_2$ from air, making the adsorption of $CO_2$ easier.

In various embodiments, the number of membranes may be single or multiple. In other words, the membranes can be stacked. Each of the stacked membranes may have a clay sheet structure. The structure shown in FIG. 1 shows a single membrane structure.

In various embodiments, $H_2O$ may also be removed using desiccators such as salts. For example, salts may be placed on the surface of the membrane or be placed near the capture side of the membrane. When the water flow carried with $CO_2$ passes through the membrane, $H_2O$ can be absorbed by the salts.

In the DACC process, $CO_2$ uptake is a spontaneous process and the energy for driving this process is mainly for the advective $CO_2$-enriched water flow. As such, the cost of the DACC process according to various embodiments of the present disclosure may reduce the cost of the DACC process compared to the conventional processes.

Particle size can be defined by sieve measurements, sedimentation method, laser diffraction method, direct microscopy, high-definition image processing, analysis of Brownian motion, or light scattering method. In various embodiments, the clay particle size may range from tens of nanometers to micrometers. For example, the clay particle size may range from about 10 nm to about 100 μm such as from about 20 nm to about 50 μm, from about 20 nm to about 30 μm, from about 15 nm to about 30 μm, from about 12 nm to about 25 μm, from about 10 nm to about 20 μm, from about 10 nm to about 10 μm, from about 10 nm to about 5 μm, and so forth.

In various embodiments, the dry density of the compacted layered material may range from 1.2 $g/cm^3$ to 1.5 $g/cm^3$, which may be calculated as a dry weight of the compacted layered material divided by a bulk volume of the compacted layered material. As used herein, the expressions "dry density" and "dry weight" refer to characteristics of a material measured at or near zero relative humidity.

In various embodiments, the porosity of the compacted layered material is defined as one unit bulk volume minus the fraction of the volume occupied by the dry mineral particles of the compacted layered material.

The $CO_2$ solubility in the clay interlayers also depends on the porosity of the clay material. As used herein, the term "porosity" refers to the volume of void spaces within the material, relative to the total volume, which has a crucial impact on how the material interacts with fluids and gases. In such materials, the arrangement, size, and distribution of these voids can vary significantly between layers, depending on the compaction process and the material's composition. This heterogeneity in porosity across different layers can result in complex flow and diffusion behaviors. In various embodiments, the porosity of the clay may range from about 5% to about 40% such as from about 5% to about 18%, from about 5% to about 15%, from about 5% to about 12%, from about 5% to about 10%, from about 5% to about 8%, from about 8% to about 20%, from about 8% to about 17%, from about 8% to about 15%, from about 8% to about 12%, from about 10% to about 18%, from about 10% to about 15%, from about 10% to about 13%. For example, the porosity of the clay may be 5%, 10%, 15%, or 20%. The pore size distribution of the material nanopores may range, for example, from about 1 nm to about 100 nm (including both intragranular interlayer pores and the intergranular nanopores).

Figure 3A:
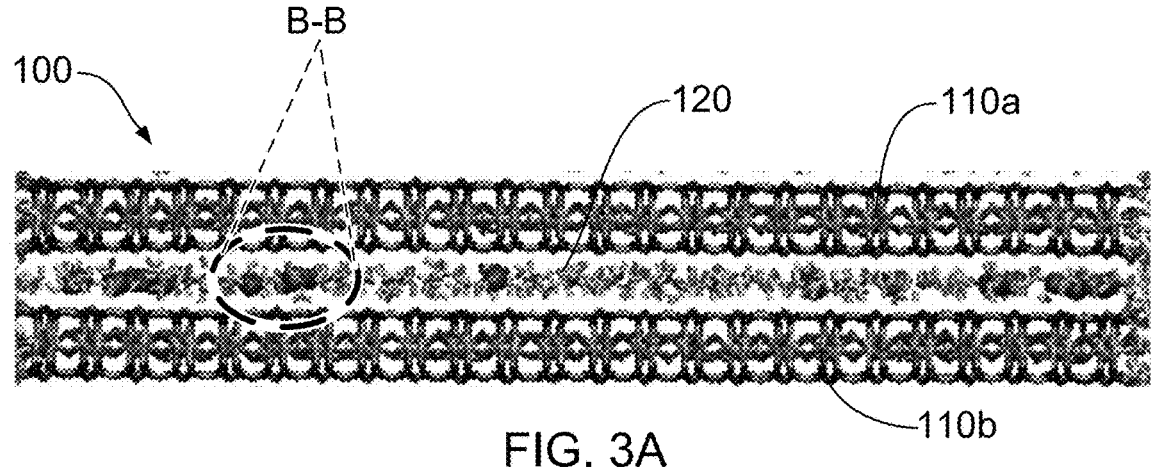
FIG. 3A is a structural diagram illustrating clay swelling after adsorbing $H_2O$ and $CO_2$ according to various embodiments of the present disclosure.
Figure 3B:
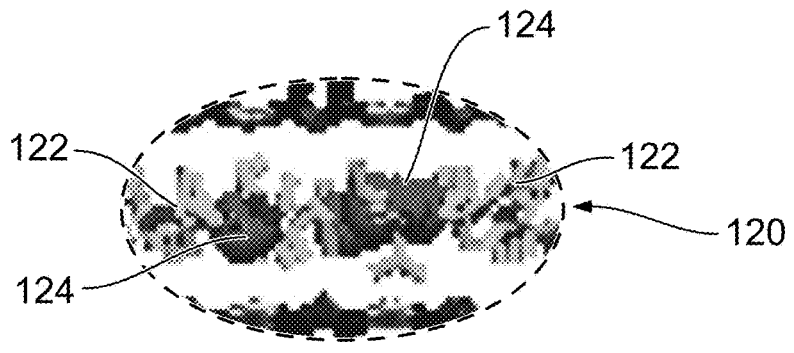
FIG. 3B is a relief view of a hydration layer at B-B in FIG. 3A, according to various embodiments.

FIG. 3A is a microscopic structural diagram illustrating clay swelling after adsorbing $H_2O$ and $CO_2$ according to various embodiments of the present disclosure. As shown in FIG. 3A, when the RH on the feed side (102) of the membrane 100 reaches a first threshold level, the clay forming the membrane 100 may form interlayers (e.g., upper clay layer 110a and lower clay layer 110b) that may adsorb $H_2O$ 122 and $CO_2$ 124 there between. When sufficient $H_2O$ is absorbed into pores of the clay forming the membrane 100, the absorbed $H_2O$ 122 functions as a vehicle for carrying the $CO_2$ 124 between the upper and lower clay layers 110a, 110b forming a hydration layer 120. The combined flow of $H_2O$ 122 and $CO_2$ 124 passing between the clay interlayers 110a, 110b in the hydration layer 120 may include concentrated levels of $CO_2$ that are 10 to 100 times that found in the bulk water. FIG. 3B is a relief view of the hydration layer 120 between the upper clay layer 110a and the lower clay layer 110b. The hydration layer 120 may contain the $H_2O$ 122 and the $CO_2$ 124 pulled from the humid air (10) introduced to the feed side (102) of the membrane (100).

A critical point for RH on the feed side (102) of the membrane 100 may be 50% for the clay interlayers 110*a*, 110*b* to function in the DACC system.

When the RH on the capture side (104) of the membrane 100 reaches a second threshold level, $H_2O$ may flow between the clay interlayers 110*a*, 110*b* and carry $CO_2$ 124 as the $H_2O$ 122 flows there through. In various embodiments, the second threshold level may be, for example, 10% or below.

Furthermore, by maintaining an RH in air (10) on the feed side (102) of 50% or above, water layer formation and a subsequent water flow can occur in the interlayer(s), thus turning a potential water interference problem into an advantage.

In various embodiments, a ratio of the RH at the feed side (102) to the RH at the capture side (104), which may be referred to as an "RH gradient," may be approximately 5:1, for example, 4.5:1, 4.6:1, 4.7:1, 4.8:1, 4.9:1, 5:1, 5.1:1, 5.2:1, 5.3:1, 5.4:1, 5.5:1 or higher. Such an RH gradient may create a high enough chemical potential gradient to drive an advective water flow (including the entrained $CO_2$) across the membrane (100).

As such, the DACC system according to the present disclosure can be controlled by adjusting the RH gradient, or RH level on the feed side or the capture side. A desired level of RH on each side can be first determined and then adjusted based on factors such as flow rate, processing time, $CO_2$ concentration, etc.

In various embodiments, $CO_2$ solubility and selectivity (against $N_2$ and $O_2$) can be enhanced in $H_2O$ which is confined in the nanoscale interlayers of clay materials (e.g., 110*a*, 110*b*). $H_2O$ is a highly selective solvent for $CO_2$ against $N_2$ and $O_2$. The $CO_2$ solubility in $H_2O$ is about 46 times as much as the $N_2$ or $O_2$ solubility in $H_2O$. In various embodiments, $CO_2$ solubility in water that is confined in paraffin-like nanopores, zeolite, mesoporous silica, and metal-organic framework (MOF) may be a few hundred times higher than bulk solubility ($CO_2$ solubility in bulk water). For example, the solubility of $CO_2$ can be enhanced by more than 100 times in clay interlayers than its bulk solubility. Other materials for compacted layered material may include but not be limited to clay and clay-derivative materials, graphene, graphene oxide, Na-montmorillonite etc.

In various embodiments, the interlayers can be viewed as 2-dimensional (2-D) systems with great flexibility and versatility for structural manipulation. Unlike a 1-D system, such as a nanotube in which the flow path can potentially be blocked, a 2-D system such as that provided by interlayers may help sustain a continuous flow.

In various embodiments, other suitable materials that can also be used as clay substrate may include but not be limited to ceramic materials such as alumina ($Al_2O_3$), or any materials with high mechanical strength to support a compacted layer structure.

In various embodiments, the thickness of the interlayers may range, for example, from about 0.1 nm to about 2 nm, from about 0.1 nm to about 2 nm, from about 0.2 nm to about 2 nm, from about 0.3 nm to about 2 nm, from about 0.3 nm to about 1 nm. For example, the thickness of the interlayers may be about 0.7 nm.

In various embodiments, a molar ratio of $CO_2/H_2O$ in hydration layers of the interlayers is higher than the molar ratio of $CO_2/H_2O$ in bulk water. The molar ratio of $CO_2/H_2O$ in hydration layers may be one to two orders of magnitude higher than the molar ratio of $CO_2/H_2O$ in bulk water. That is, swelling clays can uptake $H_2O$ and enrich $CO_2$.

Moreover, the amount of RH can affect the uptake of $CO_2$ in the hydration layers. In various embodiments, when RH increases, the uptake of $CO_2$ in the hydration layers can also increase.

Figures 4A, 4B, 4C:
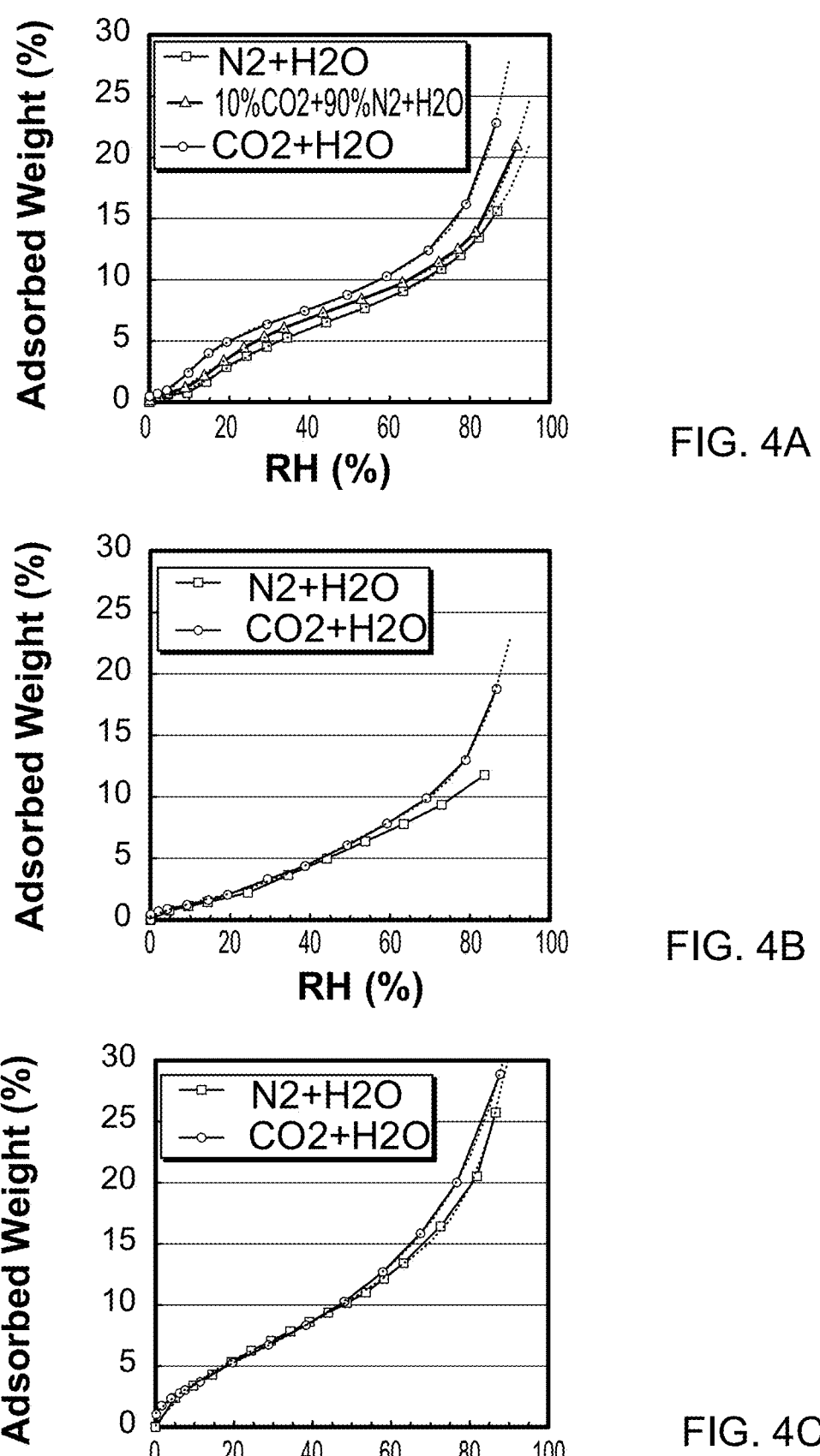
FIG. 4A is a diagram illustrating $CO_2$ and $H_2O$ adsorption using potassium saponite (K-saponite) at different relative humidities (RHs) according to various embodiments of the present disclosure.
FIG. 4B is a diagram illustrating $CO_2$ and $H_2O$ adsorption using potassium Wyoming (K-Swy2) clay at different relative humidities (RHs) according to various embodiments of the present disclosure.
FIG. 4C is a diagram illustrating $CO_2$ and $H_2O$ adsorption using sodium Wyoming (Na-Swy2) clay at different relative humidities according to various embodiments of the present disclosure.

FIG. 4A is a diagram illustrating $CO_2$ and $H_2O$ adsorption using potassium saponite (K-saponite) at different relative humidities (RHs) according to various embodiments of the present disclosure; FIG. 4B is a diagram illustrating $CO_2$ and $H_2O$ adsorption using potassium Wyoming (K-Swy2) clay at different relative humidities (RHs) according to various embodiments of the present disclosure; and FIG. 4C is a diagram illustrating $CO_2$ and $H_2O$ adsorption using sodium Wyoming (Na-Swy2) clay at different relative humidities (RHs) according to various embodiments of the present disclosure. As shown in FIG. 4A, when the clay layers include potassium saponite (K-saponite), with increasing RH, the uptake of $CO_2$ in the membrane (e.g., 100, 201, 202, 203, 204) including potassium saponite (K-saponite) also increases. Similarly, as shown in FIG. 4B, when the membrane (e.g., 100, 201, 202, 203, 204) includes potassium Wyoming (K-Swy2) clay, with increasing RH, the uptake of $CO_2$ in the membrane (e.g., 100, 201, 202, 203, 204) including potassium Wyoming (K-Swy2) clay also increases. Similarly, as shown in FIG. 4C, when the interlayer includes Wyoming (Na-Swy2) clay, with increasing RH, the uptake of $CO_2$ in the membrane (e.g., 100, 201, 202, 203, 204) including Wyoming (Na-Swy2) clay also increases.

The spectroscopic measurement of $CO_2$ shows that under the same gaseous pressure, the amount of $CO_2$ adsorbed onto the clay particles can be at least 10 times larger than the amount of $CO_2$ adsorbed into bulk water.

Figure 5A:
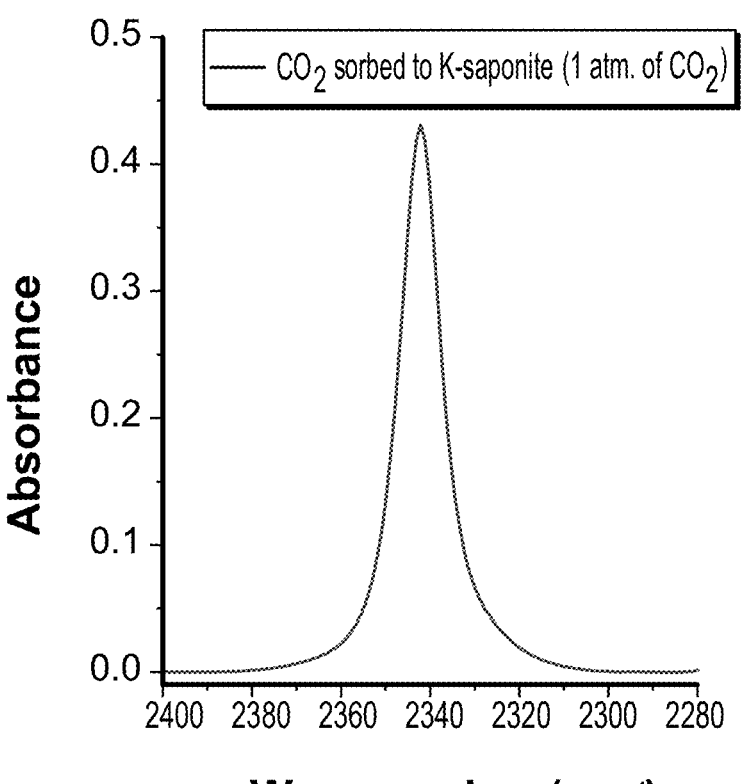
FIG. 5A illustrates attenuated total reflectance (ATR)-Fourier transform infrared spectroscopy (FTIR) of $CO_2$ adsorbed to a thin layer of K-saponite deposited on a surface of an 11 bounce ZnSe ATR cell exposed to a pulse of 100% $CO_2$ according to one embodiment of the present disclosure.
Figure 5B:
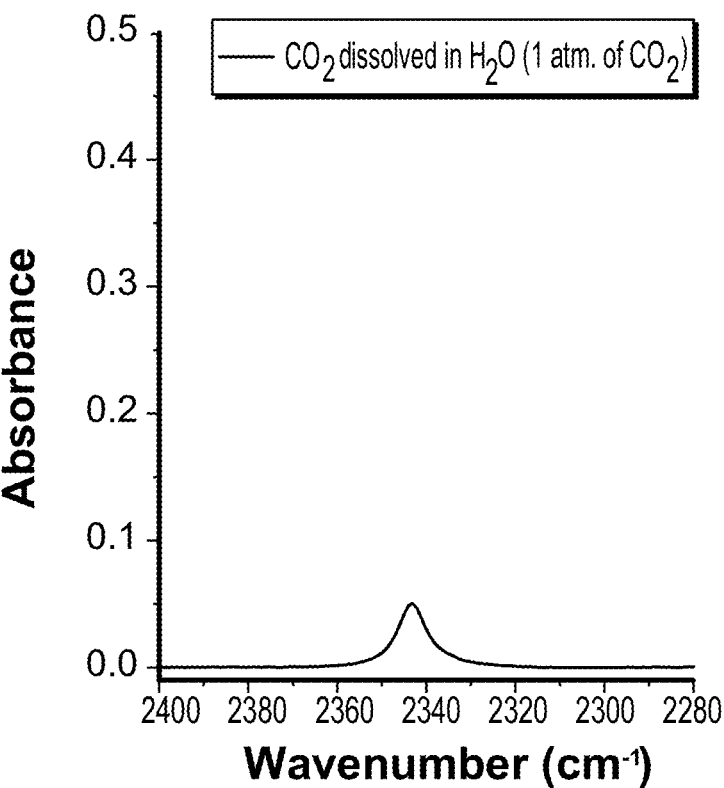
FIG. 5B illustrates ATR-FTIR spectrum of dissolved $CO_2$ in $H_2O$ plotted on a common scale when 100% $CO_2$ is dissolved in comparison with FIG. 5A.

FIG. 5A illustrates attenuated total reflectance (ATR)-Fourier transform infrared spectroscopy (FTIR) of $CO_2$ adsorbed to a thin layer of K-saponite deposited on a surface of an attenuated total reflectance (ATR) cell. A multiple reflection ATR cell was used with a trapezoidal shaped ZnSe internal reflection element that was 80 mm long by 10 mm wide and 4 mm thick with 45° angles resulting in 11 reflections. The clay deposit is exposed to a pulse of 100% $CO_2$ according to one embodiment of the present disclosure; and FIG. 5B illustrates ATR-FTIR spectrum of dissolved $CO_2$ in $H_2O$ plotted on a common scale when 100% $CO_2$ is dissolved in comparison with FIG. 5A. As shown in FIG. 5A, the ATR-FTIR spectrum of 1 atm $CO_2$ adsorbed to a thin layer of K-saponite deposited on a surface of an 11 bounce ZnSe ATR cell when exposed to a pulse of 100% $CO_2$, the peak value representing the absorbance of $CO_2$ in the thin layer of K-saponite is approximately 0.425. In contrast, as shown in FIG. 5B, when $CO_2$ is dissolved in bulk water only, the peak value of representing the absorbance of $CO_2$ in bulk water is approximately 0.05. As such, the band for absorbance of $CO_2$ in a nanoscale clay interlayer is about 10 times larger than that of 100% $CO_2$ dissolved in $H_2O$.

Figure 6A:
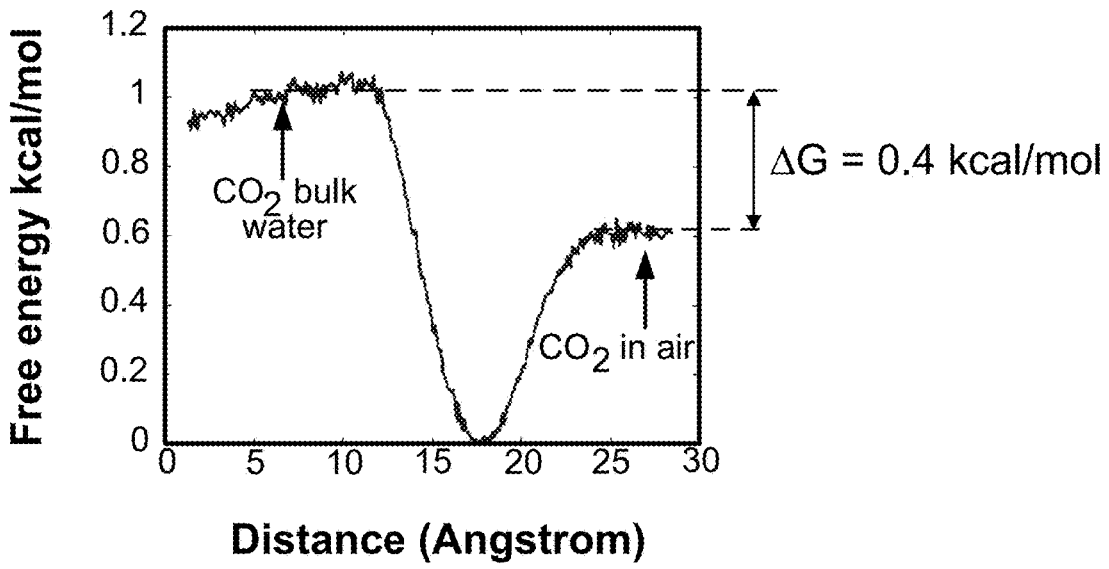
FIG. 6A illustrates free energy of $CO_2$ partition from air into water.
Figure 6B:
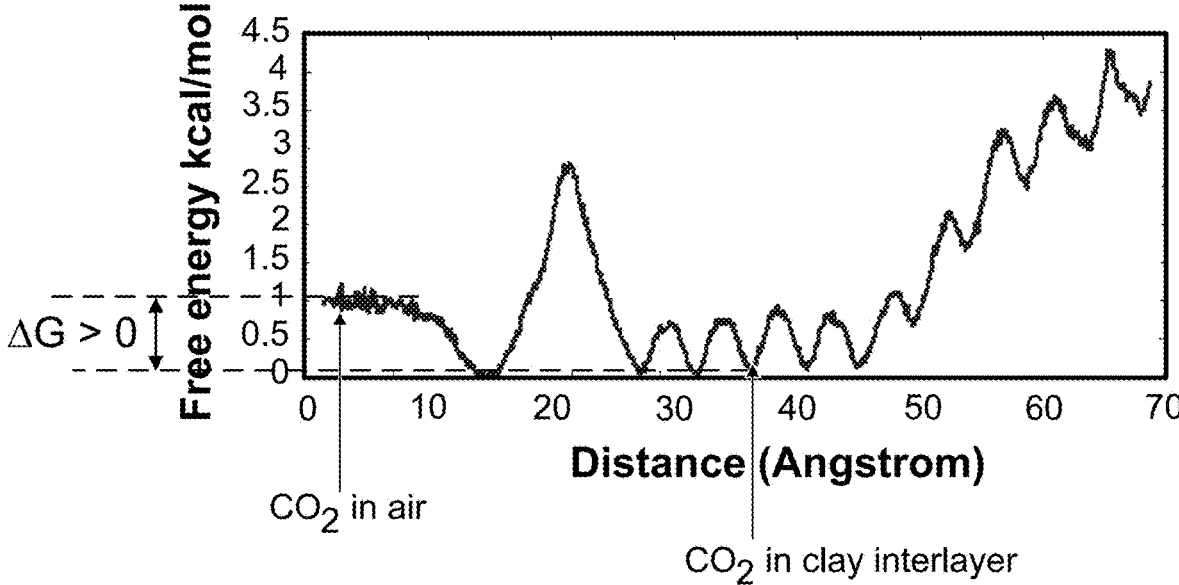
FIG. 6B illustrates free energy of $CO_2$ partition from air into clay interlayer according to one embodiment of the present disclosure.

Thermodynamic calculation also shows that the free energy required for $CO_2$ partition from air into bulk $H_2O$ positive, while the free energy required for $CO_2$ partition from air into the clay interlayer can be negative. FIG. 6A illustrates free energy of $CO_2$ partition from air into water; and FIG. 6B illustrates free energy of $CO_2$ partition from air into clay interlayer according to one embodiment of the present disclosure. As shown in FIG. 6A, the Gibbs free energy for $CO_2$ partition from air into bulk $H_2O$ is approximately 0.4 kcal/mol. In comparison, in FIG. 6B, the Gibbs free energy for $CO_2$ partition from air into the clay interlayer is approximately $-1.0$ kcal/mol. All these indicate that $CO_2$ partition in bulk water is unfavorable while $CO_2$ partition in clay interlayer can be favorable.

Figure 7A:
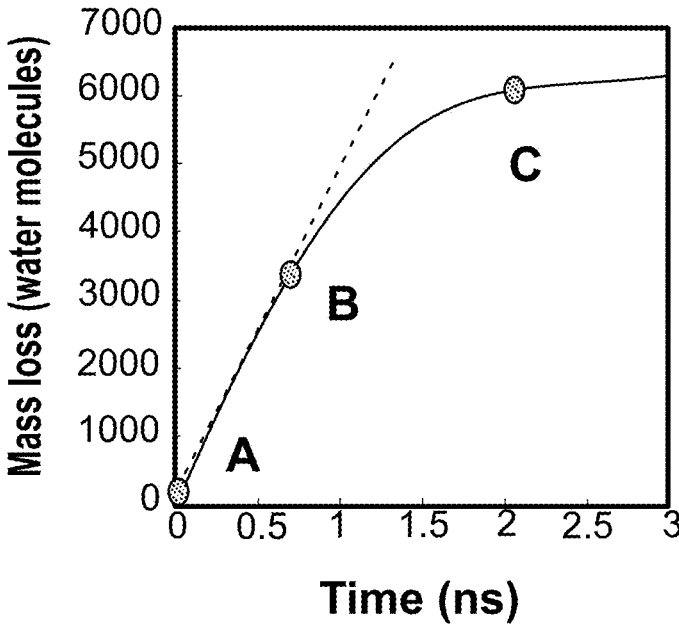
FIG. 7A is a diagram obtained from simulation illustrating the dehydration rate in clay that varies with time when relative humidity (RH) is reduced, indicating the existence of a fast advective water flow in clay interlayers.
Figure 7B:
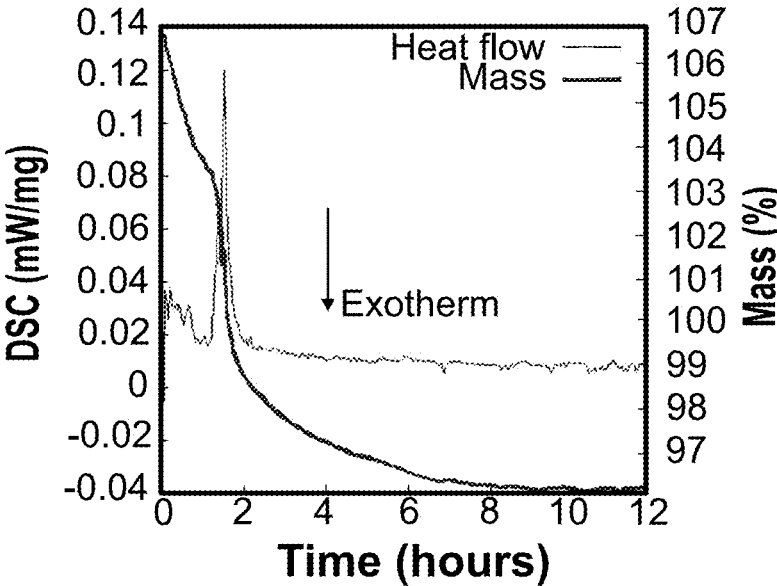
FIG. 7B is a diagram obtained from experiment illustrating the dehydration rate in clay that varies with time when RH is reduced according to various embodiments of the present disclosure.

In various embodiments, water transport in the interlayers is faster at the early stage than at later stage when RH is reduced. FIG. 7A is a mass loss diagram illustrating the number of water molecules that varies with time when relative humidity (RH) is reduced according to various embodiments of the present disclosure; and FIG. 7B is a differential scanning calorimetry (DSC) diagram illustrating heat flow and mass of water in the clay interlayer that varies with time according to various embodiments of the present disclosure. As shown in FIG. 7A, the water mass loss rate from hydration layers is faster (linear) in an early stage than later stage, when RH is reduced. Further, as shown in FIG. 7B, water mass rate changes faster at the early stage in the DSC diagram.

The present disclosure provides a system for direct air capture of $CO_2$ using a clay interlayer and a method for direct air capture of $CO_2$ using the system. Based on the method and the system, a desired level of relative humidity (RH) can be determined and adjusted. The DACC system according to the present disclosure also turns the problem with moisture existence in the air, which is oftentimes hard to remove, to an advantage of being a source of energy to create an RH gradient for driving the DACC system.

The present disclosure further provides a method 800 for direct air capture of $CO_2$ (DACC). FIG. 8 is a flow chart showing the steps for a method of direct air capture of $CO_2$ (DACC) according to various embodiments of the present disclosure. As shown in FIG. 8, in step 810, at least a first RH may be maintained at the feed side (e.g., 102) of the membrane (e.g., 100, 201, 202, 203, 204) and a second RH may be maintained at the capture side (e.g., 104) of the membrane. Maintenance of the first RH and the second RH may generate an RH gradient required for driving the water flow, drawn from humid air on the feed side of the membrane, through the membrane.

In step 820, in response to the enriched $CO_2$ water flowing out of the capture side of the membrane, water may be separated from the enriched $CO_2$. The first RH may be high enough to load a pore volume of the membrane that supports a hydration layer configured to draw $CO_2$ and $H_2O$ through the membrane. Certain levels of RH may not support the formation or maintenance of one hydration layer. By using an RH of approximately 50% or higher, various embodiments use such RH levels to load the pore volume of the membrane, which in-turn enable the creation and support of the hydration layer(s). The feed side of the membrane may be fed humid air and the capture side of the membrane may be configured to capture the enriched $CO_2$ water flow.

For a commercial DACC system (e.g., >1Mt $CO_2$/year), the footprint of a DACC system can be several acres. In various embodiments, the $CO_2$ concentration in the clay nanopores is 145 g/l, i.e., 100 times higher than $CO_2$ solubility in bulk water (i.e., 1.45 g/l). In the industrial applications where the dimension of a membrane is considerable and a large amount of $CO_2$ needs to be captured by transporting $CO_2$-enriched water through the clay interlayers caused by RH gradient, the operational cost may be significantly reduced. To that end, the DACC system according to the present disclosure can implement a direct air capture of $CO_2$ using clay materials that are available in bulk, inexpensive, and chemically durable, thus offering great potential to reduce the capital and operational cost.

Implementation examples are described in the following paragraphs.

Example 1. A system for direct air capture of $CO_2$ (DACC), comprising: a membrane formed from compacted layered material and configured to draw $CO_2$ and $H_2O$ from air on a feed side of the membrane into interlayers in the membrane through gas over-solubility induced by nanopore confinement and a differential solubility of $CO_2$ over $N_2$ and $O_2$ in $H_2O$, wherein the membrane comprises a capture side for collecting a $CO_2$-enriched $H_2O$ flow configured to be generated on the capture side from the $CO_2$ and $H_2O$ drawn through the membrane, wherein a relative humidity (RH) of the air loads and maintains therein at least one hydration layer in the interlayers of the compacted layered material.

Example 2. The system of example 1, wherein the membrane is further configured to maintain a predetermined RH for $H_2O$ vapor to condense into the interlayers such that $N_2$ and $O_2$ are restricted from passing through the membrane through the differential solubility of $CO_2$ over $N_2$ and $O_2$ in $H_2O$.

Example 3. The system of any one or more of examples 1-2, wherein the compacted layered material comprises at least one of: expandable clay and clay-derivative materials comprising montmorillonite, beidellite, nontronite, volkonskoite, hectorite, saponite, sauconite; graphene; or a graphene oxide, wherein the expandable clay and clay-derivative materials comprise at least one of cations $Na^+$, $K^+$, $Ca^{2+}$, $Li^+$, $Rb^+$, $Cs^+$, $Mg^{2+}$, or $Ba^{2+}$ in the interlayers.

Example 4. The system of any one or more of examples 1-3, wherein a porosity of the compacted layered material of the interlayer ranges from 5% to 40% and the pore size distribution of the compacted layered material ranges from about 1 nm to about 100 nm.

Example 5. The system of any one or more of examples 1-4, wherein a dry density of the compacted layered material ranges from 1.2 g/cm$^3$ to 1.5 g/cm$^3$, wherein the dry density is calculated as a dry weight of the compacted layered material divided by a bulk volume of the compacted layered material.

Example 6. The system of any one or more of examples 1-5, wherein a particle size of the compacted layered material ranges from 10 nm to 10 μm.

Example 7. The system of any one or more of examples 1-6, wherein the membrane comprises a structural support layer disposed on each of two opposed sides of the membrane.

Example 8. The system of any one or more of examples 1-7, further comprising: at least one desiccator salt configured to absorb water from the $CO_2$-enriched $H_2O$ flow on the capture side.

Example 9. The system of any one or more of examples 1-8, wherein a ratio of a first RH at the feed side to a second RH at the capture side is at least 5:1.

Example 10. The system of any one or more of examples 1-9, wherein a first RH at the feed side is at least 50%, and a second RH at the capture side is less than 10%.

Example 11. A method for direct air capture of $CO_2$ (DACC), comprising: maintaining at least a first relative humidity (RH) at a feed side of a membrane and a second RH at a capture side of the membrane, wherein the membrane is formed from compacted layered material; and in response to enriched $CO_2$ water flowing out of the capture side of the membrane, separating water from the enriched $CO_2$, wherein the first RH loads and maintains at least one hydration layer in interlayers of the compacted layered material and to draw $CO_2$ and $H_2O$ through the membrane, wherein the feed side of the membrane is fed with humid air and the capture side of the membrane is configured to capture the enriched $CO_2$ water flow.

Example 12. The method of example 11, further comprising: compressing the captured $CO_2$-enriched water flow at low-pressure to encourage condensation of the $H_2O$.

Example 13. The method of any one or more of examples 11-12, wherein the first RH at the feed side is at least 50%, and the second RH at the capture side is equal to or less than 10%.

Example 14. The method of any one or more of examples 11-13, further comprising: maintaining a predetermined RH on the feeding side for water vapor to condense into the interlayers such that $N_2$ and $O_2$ can be prevented from passing through the membrane through differential solubility of $CO_2$ over $N_2$ and $O_2$ in water.

Example 15. The method of any one or more of examples 11-14, further comprising: placing at least one desiccant salt on the capture side of the membrane to absorb the water and separate the water from the enriched $CO_2$ water flow.

Example 16. The method of any one or more of examples 11-15, wherein the compacted materials comprise at least one of: expandable clay and clay-derivative materials comprising montmorillonite, beidellite, nontronite, volkonskoite, hectorite, saponite, sauconite; graphene; or a graphene oxide, wherein the expandable clay and clay-derivative materials comprise at least one of cations $Na^+$, $K^+$, $Ca^{2+}$, $Li^+$, $Rb^+$, $Cs^+$, $Mg^{2+}$, or $Ba^{2+}$ in the interlayers.

Example 17. The method of any one or more of examples 11-16, wherein a porosity of the compacted layered material ranges from 5% to 40% and a pore size distribution of the compacted layered material ranges from about 1 nm to about 100 nm.

Example 18. The method of any one or more of examples 11-17, wherein a dry density of the compacted layered material ranges from 1.2 g/cm³ to 1.5 g/cm³, wherein the dry density is calculated as the dry weight of the compacted layered material divided by a bulk volume of the compacted layered material.

Example 19. The method of any one or more of examples 11-18, wherein a particle size of the clay ranges from 10 nm to 10 μm.

Example 20. The method of any one or more of examples 11-19, wherein an RH difference between the feed side and the capture side of the membrane is adjustable for the water to flux across the membrane and the RH difference between the feed side and the capture side supplies the energy consumption of the $CO_2$ capture process.

What is claimed is:

1. A system for direct air capture of CO2 (DACC), comprising:

a membrane formed from compacted layered material and configured to draw CO2 and H2O from air on a feed side of the membrane into interlayers in the membrane through gas over-solubility induced by nanopore confinement and a differential solubility of CO2 over N2 and O2 in H2O, wherein the membrane comprises a capture side for collecting a CO2-enriched H2O flow configured to be generated on the capture side from the CO2 and H2O drawn through the membrane, wherein a relative humidity (RH) of air loads maintains at least one hydration layer in the interlayers of the compacted layered material.

2. The system of claim 1, wherein the membrane is further configured to maintain a predetermined RH for H2O vapor to condense into the interlayers such that N2 and 02 are restricted from passing through the membrane through the differential solubility of CO2 over N2 and O2 in H2O.

3. The system of claim 1, wherein the compacted layered material comprises at least one of: expandable clay and clay-derivative materials comprising montmorillonite, beidellite, nontronite, volkonskoite, hectorite, saponite, sauconite; graphene; or a graphene oxide, wherein the expandable clay and clay-derivative materials comprise at least one of cations Na+, K+, Ca2+, Li+, Rb+, Cs+, Mg2+, or Ba2+ in the interlayers.

4. The system of claim 1, wherein a porosity of the compacted layered material ranges from 5% to 40% and a pore size distribution of the compacted layered material ranges from about 1 nm to about 100 nm.

5. The system of claim 1, wherein a dry density of the compacted layered material ranges from 1.2 g/cm3 to 1.5 g/cm3, wherein the dry density is calculated as a dry weight of the compacted layered material divided by a bulk volume of the compacted layered material.

6. The system of claim 1, wherein a particle size of the compacted layered material ranges from 10 nm to 10 μm.

7. The system of claim 1, wherein the membrane comprises a structural support layer disposed on each of two opposed sides of the membrane.

8. The system of claim 1, further comprising:

at least one desiccator salt configured to absorb water from the CO2-enriched H2O flow on the capture side.

9. The system of claim 1, wherein a ratio of a first RH at the feed side to a second RH at the capture side is at least 5:1.

10. The system of claim 1, wherein a first RH at the feed side is at least 50%, and a second RH at the capture side is less than 10%.

*   *   *   *   *